United States Patent
Enokihara et al.

[11] Patent Number: 5,400,416
[45] Date of Patent: Mar. 21, 1995

[54] OPTICAL MODULATION DEVICE WITH COUPLED LINE STRUCTURE AND METHOD OF DRIVING THE SAME

[75] Inventors: Akira Enokihara, Osaka; Kentaro Setsune, Sakai; Morikazu Sagawa, Tama; Mitsuo Makimoto, Yokohama, all of Japan

[73] Assignee: Matsushita Electric Industrial Co., Ltd., Japan

[21] Appl. No.: 106,649

[22] Filed: Aug. 16, 1993

[30] Foreign Application Priority Data

Sep. 28, 1992 [JP] Japan ................... 4-258186

[51] Int. Cl.$^6$ ................................. G02B 6/10
[52] U.S. Cl. ................................. 385/2; 385/4; 385/8
[58] Field of Search ......................... 385/2, 4, 8

[56] References Cited

U.S. PATENT DOCUMENTS

| | | | |
|---|---|---|---|
| 3,923,374 | 12/1975 | Martin | 385/8 |
| 4,005,927 | 2/1977 | Caton | 385/8 |
| 4,048,591 | 9/1977 | Auracher | 385/2 |
| 4,199,221 | 4/1980 | Rivoallan et al. | 385/8 |
| 4,372,643 | 2/1983 | Liu et al. | 385/11 |
| 4,607,909 | 8/1986 | Sanford | 385/8 |
| 4,778,235 | 10/1988 | Fujiwara | 385/8 |
| 4,807,952 | 2/1989 | Jaeger et al. | 385/8 |
| 4,818,063 | 4/1989 | Takizawa | 385/8 |
| 4,961,130 | 8/1989 | Katsuyama et al. | 385/2 |

OTHER PUBLICATIONS

"Transactions of the Institute of Electronics, Information and Communication Engineers of Japan", vol. J71-c, No. 5 May 1988 pp. 635-658.

"Transactions of the Institute of Electronics, Information and Communication Engineers of Japan", vol. E-71, No. 4 Apr. 1988, pp. 342-344.

Transactions of the Institute of Electronics, Information and Communication Engineers of Japan, vol. J71-C, No. 5, May 1988, Tokyo JP, pp. 635-658, Izutsu M et l. 'Guided-wave light modulator using a resonant co-planar electrode'.

Transactions of the Institute of Electronics, Information and Communication Engineers of Japan, vol. E-71, No. 4, Apr. 1988, Tokyo JP, pp. 342-344, XP000071412, Izutsu M et al. 'On the design of resonant electrodes for efficient guided-wave ligh modulators'.

Primary Examiner—Akm E. Ullah
Attorney, Agent, or Firm—Parkhurst, Wendel & Rossi

[57] ABSTRACT

An optical modulation device includes a substrate. An optical waveguide is formed on the substrate. The optical waveguide exhibits an electro-optical effect. Parallel lines electromagnetically coupled with each other are formed on the substrate. The parallel lines extend at opposite sides of the optical waveguide respectively. The parallel lines are of a microstrip line structure. The parallel lines may alternatively be of a strip line structure or a coplanar line structure.

24 Claims, 6 Drawing Sheets

OPTICAL MODULATION DEVICE WITH COUPLED LINE STRUCTURE AND METHOD OF DRIVING THE SAME

BACKGROUND OF THE INVENTION

Field of the Invention

This invention relates to an optical modulation device. This invention also relates to a method of driving an optical modulation device.

Description of the Prior Art

Semiconductor lasers are widely used as light sources in optical communication systems. A typical way of modulating an optical signal is to control the injection current of a semiconductor laser in response to a modulating signal. However, it is generally difficult to operate a semiconductor laser a higher than several GHz frequencies by such direct modulation.

External electro-optic waveguide modulators using dielectric crystals can perform higher-frequency modulation. A typical electro-optic waveguide modulator includes a transmission line and an optical waveguide. The transmission line serves as a modulating electrode which enables a modulating signal to propagate on an electro-optical crystal. The optical waveguide extends near the transmission line. An electric field is induced around the modulating electrode in response to the modulating signal. The electro-optical effect causes the refractive indices of the optical waveguide to vary with the induced electric field. Accordingly, the phase of a light wave in the optical waveguide is varied in response to the modulating signal so that optical modulation is realized.

General electro-optical crystals such as an $LiNbO_3$ crystal do not have large electro-optical coefficients. Thus, in an electro-optical modulator, it is important to effectively apply a modulating electric field to an optical waveguide to attain a good modulation efficiency.

SUMMARY OF THE INVENTION

It is an object of this invention to provide an improved optical modulation device.

It is another object of this invention to provide a method of driving an optical modulation device.

A first aspect of this invention provides an optical modulation device comprising a substrate; an optical waveguide formed on the substrate and exhibiting an electro-optical effect; parallel lines electromagnetically coupled with each other and formed on the substrate, the parallel lines extending at opposite sides of the optical waveguide respectively and being of a microstrip line structure.

A second aspect of this invention provides an optical modulation device comprising a substrate; an optical waveguide formed on the substrate and exhibiting an electro-optical effect; parallel lines electromagnetically coupled with each other and formed on the substrate, the parallel lines extending at opposite sides of the optical waveguide respectively and being of a strip line structure.

A third aspect of this invention provides an optical modulation device comprising a substrate; an optical waveguide formed on the substrate and exhibiting an electro-optical effect; parallel lines electromagnetically coupled with each other and formed on the substrate, the parallel lines extending at opposite sides of the optical waveguide respectively and being of a coplanar line structure.

A fourth aspect of this invention provides an optical modulation device comprising an optical waveguide exhibiting an electro-optical effect; first and second parallel lines electromagnetically coupled with each other and extending at opposite sides of the optical waveguide respectively; means for applying a light beam to the optical waveguide, wherein the applied light beam propagates along the optical waveguide; means for feeding a modulating signal to the first and second parallel lines; and means for exciting a modulating wave in an odd mode (antisymmetric mode) in the first and second parallel lines in response to the modulating signal, wherein an electric field is developed between the first and second parallel lines in accordance with the excited modulating wave in the odd mode, and the electric field acts on the optical waveguide to modulate the light beam in accordance with the modulating signal.

A fifth aspect of this invention provides a method of driving an optical modulation device having an optical waveguide exhibiting an electro-optical effect, and first and second parallel lines electromagnetically coupled with each other and extending at opposite sides of the optical waveguide respectively, the method comprising the steps of applying a light beam to the optical waveguide, wherein the applied light beam propagates along the optical waveguide; feeding a modulating signal to the first and second parallel lines; and exciting a modulating wave in an odd mode in the first and second parallel lines in response to the modulating signal, wherein an electric field is developed between the first and second parallel lines in accordance with the excited modulating wave in the odd mode, and the electric field acts on the optical waveguide to modulate the light beam in accordance with the modulating signal.

DESCRIPTION OF THE BACKGROUND ART

Background-art optical modulation devices will be described hereinafter for a better understanding of this invention.

Figure 1:
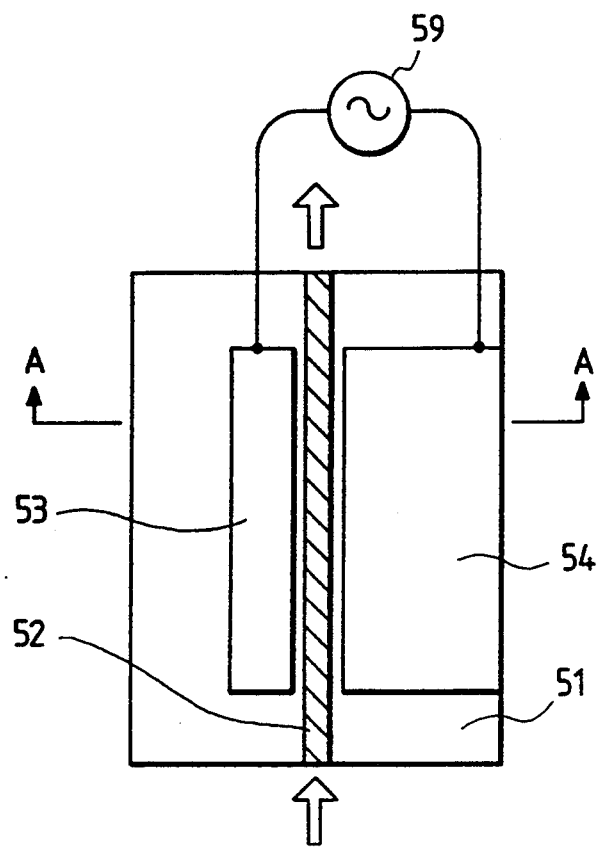
FIG. 1 is a plan view of a background-art optical modulation device.
Figure 2:
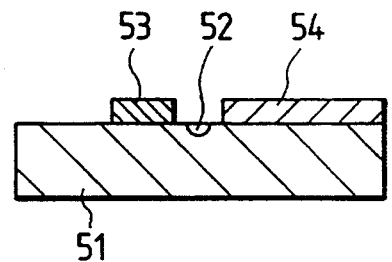
FIG. 2 is a sectional view taken along the line A—A of FIG. 1.

With reference to FIGS. 1 and 2, a first background-art optical modulation device includes a substrate 51 exhibiting an electro-optical effect. An optical waveguide 52 is formed in an upper surface of the substrate 51. The optical waveguide 52 also exhibits an electro-optical effect. The optical waveguide 52 extends along a centerline of the upper surface of the substrate 51. A light wave propagates along the optical waveguide 52.

Modulating electrodes including a strip electrode 53 and a ground electrode 54 are formed on the upper surface of the substrate 51. The strip electrode 53 and the ground electrode 54 are made of metal films such as aluminum films. The strip electrode 53 and the ground electrode 54 extend at opposite sides of the optical waveguide 52 respectively. The strip electrode 53 and the ground electrode 54 form a portion of a transmission line along which a modulating wave propagates.

A signal source for generating a modulating signal is electrically connected between the strip electrode 53 and the ground electrode 54. Thus, the modulating signal is applied between the strip electrode 53 and the ground electrode 54. A modulating wave corresponding to the modulating signal propagates in the strip electrode 53 so that an electric field depending on the modulating wave is developed between the strip electrode 53 and the ground electrode 54. As a result, the optical waveguide 52 is subjected to the electric field which depends on the modulating signal. The electro-optical effect causes the refractive indices of the optical waveguide 52 to vary with the electric field. Accordingly, the phase of the light wave in the optical waveguide 52 is varied in response to the modulating signal so that optical modulation is realized.

Since the potential at the ground electrode 54 remains zero, the potential difference between the strip electrode 53 and the ground electrode 54 is limited to a level corresponding to the potential at the strip electrode 53. In the case where the strip electrode 53 has a normal structure of a microstrip line, a ground plane provided on a lower surface of the substrate 51 also serves as a ground electrode so that the intensity of the electric field developed around the strip electrode 53 tends to be very small. To compensate for this tendency and thereby attain an adequately-strong electric field, the strip electrode 53 and the ground electrode 54 are of a coplanar line structure which enables a small distance therebetween.

In general, the coplanar line structure causes a relatively large loss of propagation of the modulating wave which results in a reduced modulation efficiency. The relation of the width of the strip electrode 53 with the distance between the strip electrode 53 and the ground electrode 54 determines the characteristic impedance of the transmission line. Thus, as the distance between the strip electrode 53 and the ground electrode 54 decreases, the width of the strip electrode 53 is generally required to also decrease to hold the characteristic impedance of the transmission line in a practically usable range (for example, in the range of around 50Ω). The decreased width of the strip electrode 53 causes a greater loss of the transmission line.

A second background-art optical modulation device is similar to the first background-art optical modulation device except for design changes indicated hereinafter. In the second background-art optical modulation device, a strip electrode 53 is suitably terminated at opposite ends thereof to form a line resonator. An available modulation efficiency increases as the Q (quality) factor of the line resonator increases. To provide a good line resonator, the length of the strip electrode 53 is set equal to about a half of the wavelength of a modulating signal. Thus, in the second background art optical modulation device, the strip electrode 53 tends to be relatively long. In the case where the frequency of a modulation signal is so high that the time spent by light to pass through a side of the strip electrode 53 can not be ignored as compared with one period of the modulating signal, an available modulation efficiency abruptly drops as the length of the strip electrode 53 increases above a given length.

DESCRIPTION OF THE FIRST PREFERRED EMBODIMENT

Figure 3:
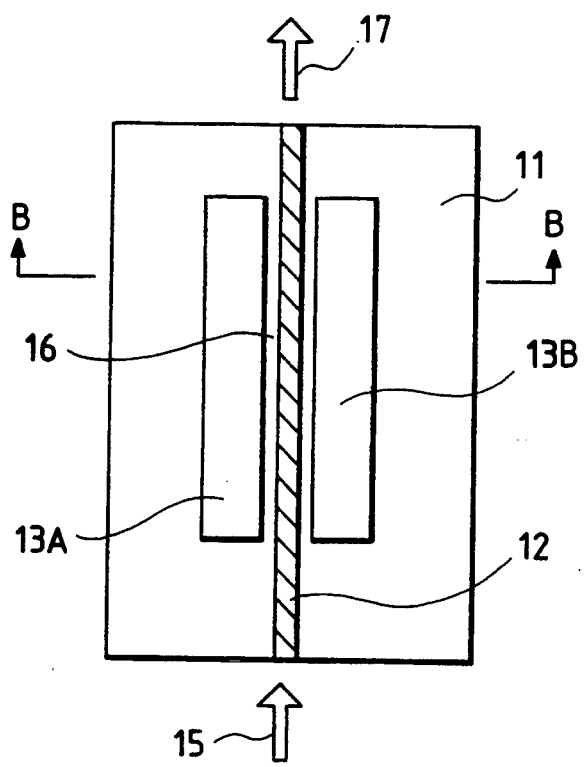
FIG. 3 is a plan view of an optical modulation device according to a first embodiment of this invention.
Figure 4:
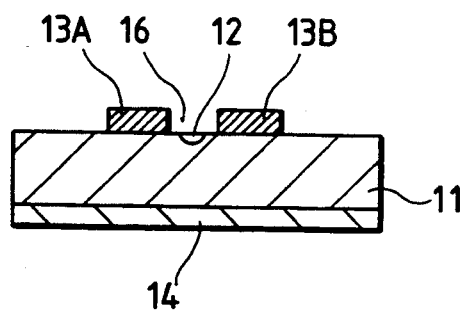
FIG. 4 is a sectional view taken along the line B—B of FIG. 3.

With reference to FIGS. 3 and 4, an optical modulation device (optical modulation element) includes a substrate 11 exhibiting an electro-optical-effect. The substrate 11 has a shape of a rectangular 5 or square flat plate. The substrate 11 is made of, for example, a single crystal of $LiNbO_3$ (lithium niobate).

An optical waveguide 12 is formed in an upper surface of the substrate 11 by a suitable process such as a Ti (titanium) thermal diffusion process. The optical waveguide 12 also exhibits an electro-optical effect. The optical waveguide 12 extends between opposite sides of the substrate 11 along a centerline of the upper surface thereof.

Parallel lines 13A and 13B electromagnetically coupled with each other are formed on the upper surface of the substrate 11 at opposite sides of the optical waveguide 12 respectively. The parallel lines 13A and 13B include thin metal films such as thin Al (aluminum) films or thin Au (gold) films made by suitable thin film forming processes such as a vacuum vapor deposition process, a process of photolithography, and a reactive ion etching process. The parallel lines 13A and 13B extend along or in parallel to the optical waveguide 12. The parallel lines 13A and 13B are spaced from each other by a predetermined gap 16 at which the optical waveguide 12 is exposed.

A ground plane 14 including a metal film is formed on a lower surface of the substrate 11 by a suitable process such as a vapor deposition process. Thus, the parallel lines 13A and 13B, the substrate 11, and the ground plane 14 compose a microstrip structure.

An input light beam 15 is applied to one end of the optical waveguide 12. The input light beam 15 enters the optical waveguide 12 via the end thereof and then travels along the optical waveguide 12, exiting from the other end of the optical waveguide 12 and forming an output light beam 17. While the input light beam 15 travels along the optical waveguide 12, it passes through a region adjoining the gap 16 between the parallel lines 13A and 13B. In the case where a modulating wave corresponding to a modulating signal is propagated along the parallel lines 13A and 13B by a suitable method, an electric field depending on the modulating signal is developed in and around the gap 16 and hence the refractive indices of the optical waveguide 12 are varied with the electric field due to the electro-optical effect. Specifically, the developed electric field has an amplitude which depends on the modulating signal.

Therefore, the phase of the output light beam 17 is varied in accordance with the modulating signal. In this way, the input light beam 15 is phase-modulated with the modulating signal.

In general, guided waves propagating along parallel lines can be in one of even modes (symmetric modes) and odd modes (antisymmetric modes). When the guided waves assume an odd mode, potentials at corresponding points in the parallel lines have opposite signs so that a strong electric field is developed in a gap between the parallel lines. Accordingly, this embodiment is designed so that the modulating wave in an odd mode can be excited along the parallel lines 13A and 13B in response to the modulating signal. Thus, a strong electric field corresponding to the modulating signal can be developed in and around the gap 16 between the parallel lines 13A and 13B. The strong electric field enables a high optical modulation efficiency.

It should be noted that a Mach-Zehnder interferometer may be formed on the substrate 11 by using a branch optical waveguide. In this case, the input light beam 15 can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion.

DESCRIPTION OF THE SECOND PREFERRED EMBODIMENT

Figure 5:
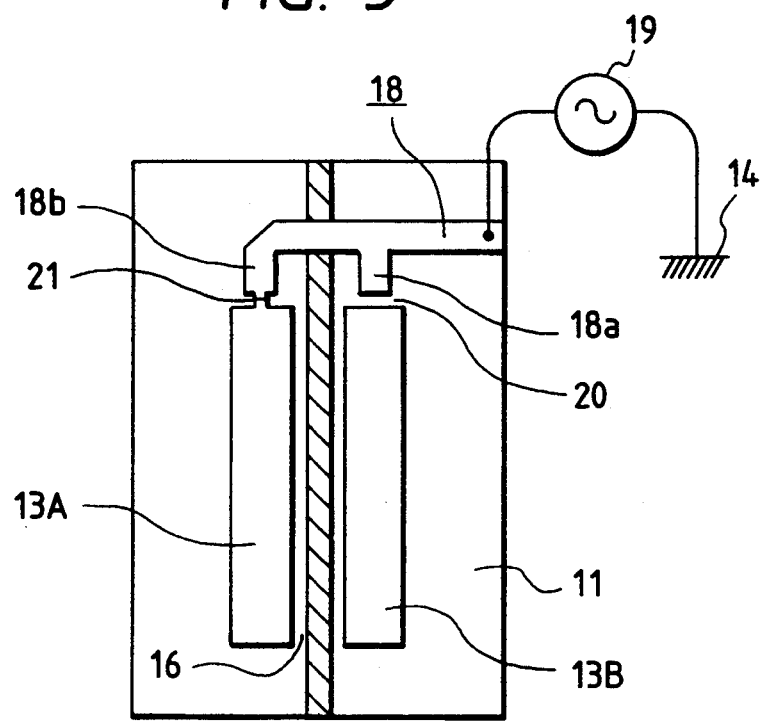
FIG. 5 is a diagram of an optical modulation device according to a second embodiment of this invention.

FIG. 5 shows a second embodiment of this invention which is similar to the embodiment of FIGS. 3 and 4 except for an additional arrangement indicated hereinafter.

As shown in FIG. 5, a signal input terminal 18 is formed on an upper surface of a substrate 11. A signal source 19 for generating a modulating signal is electrically connected between the input terminal 18 and a ground plane 14 formed on a lower surface of the substrate 11.

The input terminal 18 has two branches 18a and 18b. The branch 18a is spaced from an end of a line 13B by a predetermined gap 20 so that the branch 18a is capacitively coupled with the end of the line 13B. The branch 18b is connected to an end of a line 13A via a tap or bridge 21 so that the branch 18b is inductively coupled with the end of the line 13A. Therefore, the modulating signal generated by the signal source 19 is fed via the input terminal 18 to the parallel lines 13A and 13B in a manner such that potentials at corresponding points in the parallel lines 13A and 13B are out of phase by 180 degrees. Thus, a modulating wave in an odd mode is excited along the parallel lines 13A and 13B in response to the modulating signal, and a strong electric field corresponding to the modulating signal is developed in and around a gap 16 between the parallel lines 13A and 13B. The strong electric field enables a high optical modulation efficiency.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the branch 18a is coupled with the line 13B by a suitable capacitive element other than the gap 20 while the branch 18b is coupled with the line 13A by a suitable inductive element other than the tap 21. In a fourth modification, the input terminal 18 is formed with a stub to compensate for reflection of the modulating signal which might occur at the gap 20 and the tap 21. In a fifth modification, ends of the parallel lines 13A and 13B remote from the input terminal 18 are terminated via a resistor or resistors having resistances corresponding to the characteristic impedance of the parallel lines 13A and 13B.

DESCRIPTION OF THE THIRD PREFERRED EMBODIMENT

Figure 6:
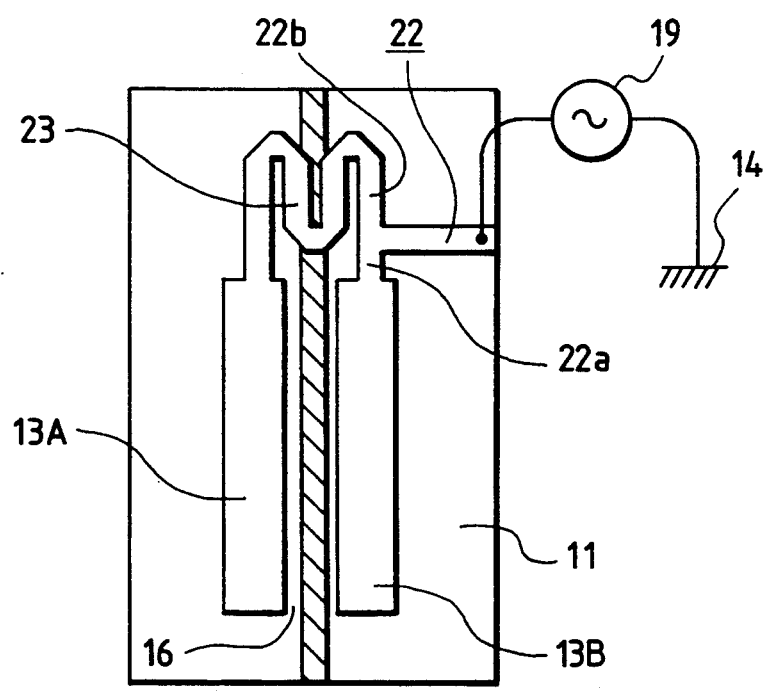
FIG. 6 is a diagram of an optical modulation device according to a third embodiment of this invention.

FIG. 6 shows a third embodiment of this invention which is similar to the embodiment of FIGS. 3 and 4 except for an additional arrangement indicated hereinafter.

As shown in FIG. 6, a signal input terminal 22 is formed on an upper surface of a substrate 11. A signal source 19 for generating a modulating signal is electrically connected between the input terminal 22 and a ground plane 14 formed on a lower surface of the substrate 11.

The input terminal 22 has two branches 22a and 22b. The branch 22a is directly connected to an end of a line 13B. The branch 22b is connected to an end of a line 13A via a signal delay element including a signal delay line 23. The delay line 23 is designed to provide a signal phase shift or a signal delay of 180 degrees. Therefore, the modulating signal generated by the signal source 19 is fed via the input terminal 22 to the parallel lines 13A and 13B in a manner such that potentials at corresponding points in the parallel lines 13A and 13B are out of phase by 180 degrees. Thus, a modulating wave in an odd mode is excited along the parallel lines 13A and 13B in response to the modulating signal, and a strong electric field corresponding to the modulating signal is developed in and around a gap 16 between the parallel lines 13A and 13B. The strong electric field enables a high optical modulation efficiency.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, ends of the parallel lines 13A and 13B remote from the input terminal 22 are terminated via a resistor or resistors having resistances corresponding to the characteristic impedance of the parallel lines 13A and 13B.

DESCRIPTION OF THE FOURTH PREFERRED EMBODIMENT

Figure 7:
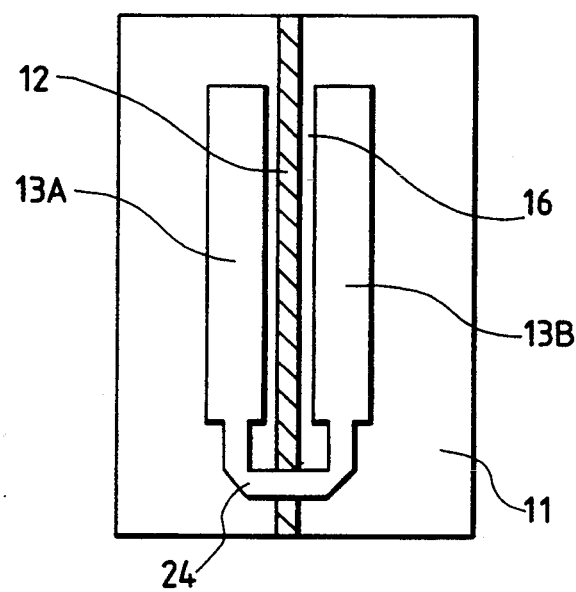
FIG. 7 is a plan view of an optical modulation device according to a fourth embodiment of this invention.

FIG. 7 shows a third embodiment of this invention which is similar to the embodiment of FIGS. 3 and 4 except for an additional arrangement indicated hereinafter.

As shown in FIG. 7, a connection line 24 is formed on an upper surface of a substrate 11. First adjacent ends of parallel lines 13A and 13B are connected to each other via the connection line 24. Second adjacent ends of the parallel lines 13A and 13B are open.

The parallel lines 13A and 13B, and the connection line 24 compose a resonator. The open ends of the parallel lines 13A and 13B reflect a modulating wave so that resonance is performed. In a fundamental resonant state, a modulating wave in an odd mode is excited along the parallel lines 13A and 13B.

Thus, in cases where the resonator is driven in response to a modulating signal by a suitable way, a strong electric field corresponding to the modulating signal is developed in and around a gap 16 between the parallel lines 13A and 13B. The strong electric field enables a high optical modulation efficiency.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the parallel lines 13A and 13B are made of superconductor to attain a high Q (quality) factor of the resonator.

DESCRIPTION OF THE FIFTH PREFERRED EMBODIMENT

Figure 8:
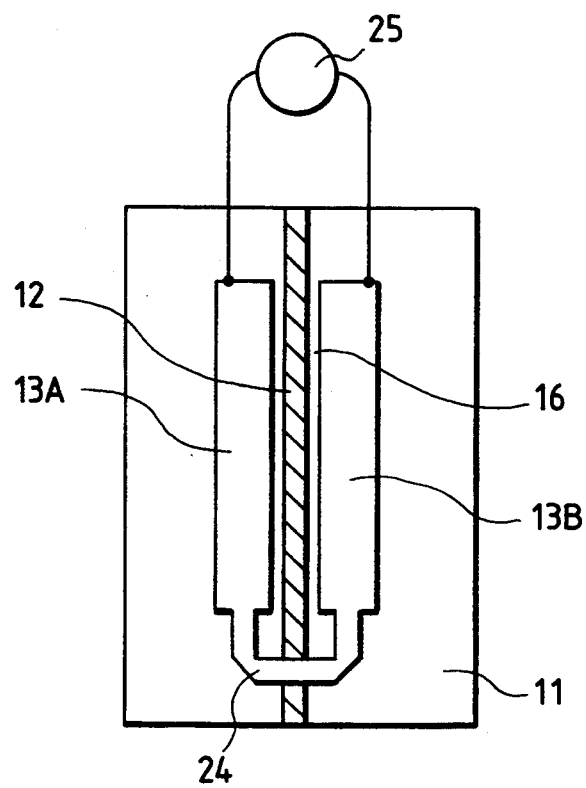
FIG. 8 is a diagram of an optical modulation device according to a fifth embodiment of this invention.

FIG. 8 shows a fifth embodiment of this invention which is similar to the embodiment of FIG. 7 except for an additional arrangement indicated hereinafter.

As shown in FIG. 8, first adjacent ends of parallel lines 13A and 13B are connected to each other via a connection line 24 while second adjacent ends of the parallel lines 13A and 13B are connected to each other via a capacitor 25. When a modulating wave is reflected at the second ends of the parallel lines 13A and 13B, the modulating wave undergoes a phase change. This phase change results in a reduction of the resonance frequency of a resonator which includes the parallel lines 13A and 13B.

It should be noted that a Mach-Zehnder interferometer may be formed on the substrate 11 by using a branch optical waveguide. In this case, an input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the second ends of the parallel lines 13A and 13B are coupled with each other via a capacitive element other than the capacitor 25, and the capacitive element includes thin films on an upper surface of a substrate 11. In this case, after a single film is formed on the upper surface of the substrate 11, the single film is patterned into the parallel lines 13A and 13B and the capacitive element. In a fourth modification, the capacitor 25 is replaced by a variable capacitance element such as a trimmer capacitor or a varactor diode. In this case, it is possible to adjust the resonance frequency of the resonator. In a fifth modification, the parallel lines 13A and 13B are made of superconductor so that the resonator has a high Q (quality) factor.

DESCRIPTION OF THE SIXTH PREFERRED EMBODIMENT

Figure 9:
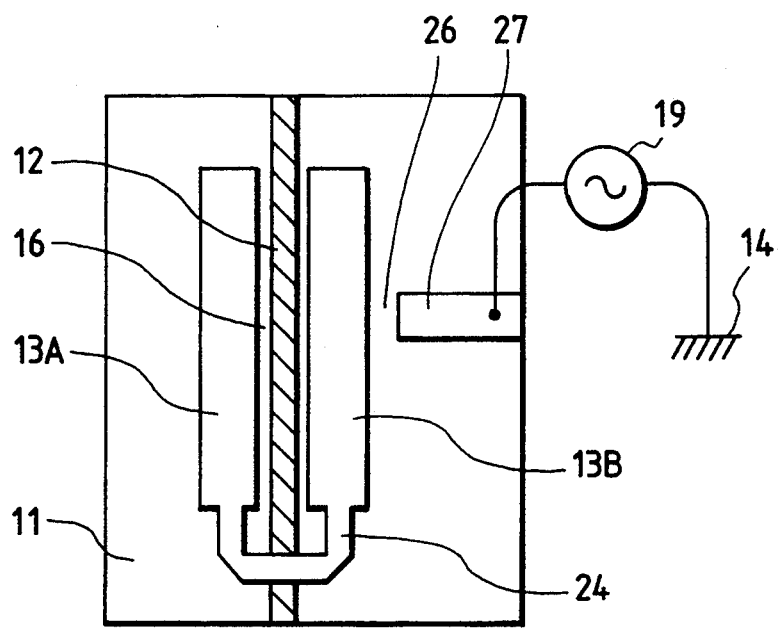
FIG. 9 is a diagram of an optical modulation device according to a sixth embodiment of this invention.

FIG. 9 shows a sixth embodiment of this invention which is similar to the embodiment of FIG. 7 except for an additional arrangement indicated hereinafter.

As shown in FIG. 9, a signal input terminal 27 is formed on an upper surface of a substrate 11. The input terminal 27 is spaced from a side of a line 13B by a gap 26 of a predetermined size. Thus, the input terminal 27 is capacitively coupled with a resonator including parallel lines 13A and 13B. A signal source 19 for generating a modulating signal is electrically connected between the input terminal 27 and a ground plane 14 formed on a lower surface of the substrate 11.

The modulating signal generated by the signal source 19 is fed to the line 13B via the input terminal 27 so that the modulating signal drives the resonator including the parallel lines 13A and 13B. Thus, an input light beam traveling along an optical waveguide 12 is modulated with the modulating signal.

The degree of the coupling between the input terminal 27 and the resonator (the parallel lines 13A and 13B) is chosen so that the resonance operation of the resonator can be optimized. It should be noted that the degree of the coupling between the input terminal 27 and the resonator can be adjusted by varying the size of the gap 26 therebetween or by shifting the place of the coupling to the resonator.

It should be noted that a Mach-Zehnder interferometer may be formed on the substrate 11 by using a branch optical waveguide. In this case, the input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the parallel lines 13A and 13B are made of superconductor so that the resonator has a high Q (quality) factor. In a fourth modification, the input terminal 27 is coupled with a portion of a connection line 24 rather than the line 13B.

DESCRIPTION OF THE SEVENTH PREFERRED EMBODIMENT

Figure 10:
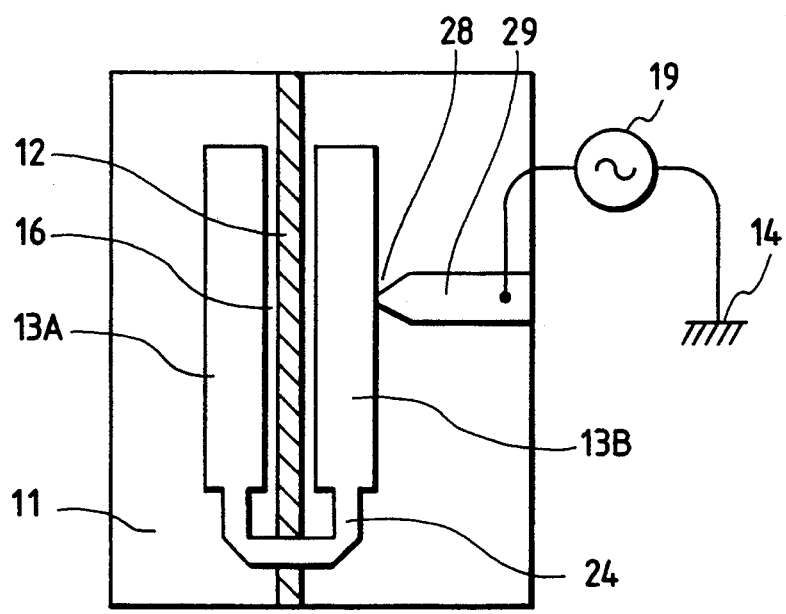
FIG. 10 is a diagram of an optical modulation device according to a seventh embodiment of this invention.

FIG. 10 shows a seventh embodiment of this invention which is similar to the embodiment of FIG. 7 except for an additional arrangement indicated hereinafter.

As shown in FIG. 10, a signal input terminal 29 is formed on an upper surface of a substrate 11. The input terminal 29 is connected to a side of a line 13B via a tap or bridge 28. Thus, the input terminal 29 is inductively coupled with a resonator including parallel lines 13A and 13B. A signal source 19 for generating a modulating signal is electrically connected between the input terminal 29 and a ground plane 14 formed on a lower surface of the substrate 11.

The modulating signal .generated by the signal source 210 is fed to the line 13B via the input terminal 29 so that the modulating signal drives the resonator including the parallel lines 13A and 13B. Thus, an input light beam traveling along an optical waveguide 12 is modulated with the modulating signal.

The degree of the coupling between the input terminal 29 and the resonator (the parallel lines 13A and 13B) is chosen so that the resonance operation of the resonator can be optimized. It should be noted that the degree of the coupling between the input terminal 29 and the resonator can be adjusted by shifting the place of the coupling to the resonator.

It should be noted that a Mach-Zehnder interferometer may be formed on the substrate 11 by using a branch optical waveguide. In this case, the input light beam can be subjected to intensity modulation.

This embodiment may be modified as follows. In a first modification, the substrate 11 is made of material other than LiNbO$_3$ (lithium niobate), and material exhibiting an electro-optical effect and having refractive indices higher than those of the substrate 11 is formed into a film-shaped optical waveguide on the substrate 11. In a second modification, the upper surface of the substrate 11 is formed with an optical-waveguide core portion having refractive indices higher than those of a surround, and an optical-waveguide cladding portion made of electro-optical material is formed on the core portion. In this case, optical modulation is executed by using an electric field of a light beam which extends out of the core portion. In a third modification, the parallel lines 13A and 13B are made of superconductor so that the resonator has a high Q (quality) factor. In a fourth modification, the input terminal 29 is coupled with a portion of a connection line 24 rather than the line 13B.

DESCRIPTION OF THE EIGHTH PREFERRED EMBODIMENT

Figure 11:
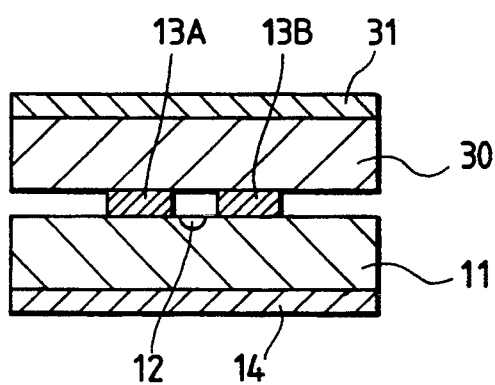
FIG. 11 is a sectional view of an optical modulation device according to an eighth embodiment of this invention.

FIG. 11 shows an eighth embodiment of this invention which is similar to one of the embodiments of FIGS. 3–10 except for an additional arrangement indicated hereinafter.

As shown in FIG. 11, the eighth embodiment has a strip line structure. Specifically, parallel lines 13A and 13B extend between an upper surface of a substrate 11 and a lower surface of a dielectric member 30. A ground plane 31 is formed on an upper surface of the dielectric member 30.

DESCRIPTION OF THE NINTH PREFERRED EMBODIMENT

Figure 12:
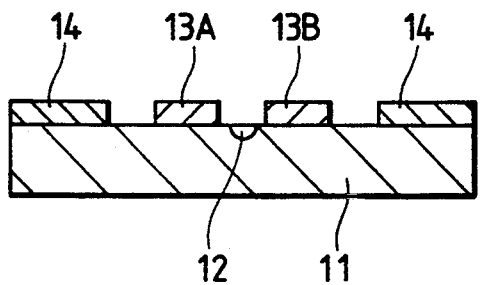
FIG. 12 is a sectional view of an optical modulation device according to a ninth embodiment of this invention.

FIG. 12 shows a ninth embodiment of this invention which is similar to one of the embodiments of FIGS. 3–10 except for design changes indicated hereinafter.

As shown in FIG. 12, the ninth embodiment has a coplanar line structure. Specifically, ground planes 14 are formed on an upper surface of a substrate 11, and parallel lines 13A and 13B extend between the ground planes 14.

What is claimed is:

1. An optical modulation device comprising:
   a substrate having first and second surfaces opposite to each other;
   an optical waveguide formed on the first surface of the substrate and exhibiting an electro-optical effect;
   first and second parallel lines electromagnetically coupled with each other and formed on the substrate, the first and second parallel lines extending at opposite sides of the optical waveguide respectively and being of a microstrip line structure;
   wherein the first line comprises a first line member and a ground plane, and the second line comprises a second line member and the ground plane, wherein the first line member and the second line member are formed on the first surface of the substrate and the ground plane is located on the second surface of the substrate.

2. An optical modulation device comprising:
   a substrate having first and second surfaces opposite to each other;
   an optical waveguide formed on the first surface of the substrate and exhibiting an electro-optical effect;
   first and second parallel lines electromagnetically coupled with each other and formed on the substrate, the first and second parallel lines extending at opposite sides of the optical waveguide respectively and being of a strip line structure;
   wherein the first line comprises a first line member and a ground plane, and the second line comprises a second line member and the ground plane, wherein the first line member and the second line member are formed on the first surface of the substrate and the ground plane is located on the second surface of the substrate.

3. An optical modulation device comprising:
   a substrate having a surface;
   an optical waveguide formed on the surface of the substrate and exhibiting an electro-optical effect;

first and second parallel lines electromagnetically coupled with each other and formed on the substrate, the first and second parallel lines extending at opposite sides of the optical waveguide respectively and being of a coplanar line structure;

wherein the first line comprises a first line member and a ground plane, and the second line comprises a second line member and the ground plane, and wherein the first line member, the second line member, and the ground plane extend on the surface of the substrate.

4. The optical modulation device of claim 1, wherein first adjacent ends of the first and second parallel lines are open, and second adjacent ends of the first and second parallel lines are connected to each other via a connection line.

5. The optical modulation device of claim 2, wherein first adjacent ends of the first and second parallel lines are open, and second adjacent ends of the first and second parallel lines are connected to each other via a connection line.

6. The optical modulation device of claim 3, wherein first adjacent ends of the first and second parallel lines are open, and second adjacent ends of the first and second parallel lines are connected to each other via a connection line.

7. The optical modulation device of claim 1, further comprising means for capacitively coupling first adjacent ends of the first and second parallel lines, and a connection line for connecting second adjacent ends of the first and second parallel lines.

8. The optical modulation device of claim 2, further comprising means for capacitively coupling first adjacent ends of the first and second parallel lines, and a connection line for connecting second adjacent ends of the first and second parallel lines.

9. The optical modulation device of claim 3, further comprising means for capacitively coupling first adjacent ends of the first and second parallel lines, and a connection line for connecting second adjacent ends of the first and second parallel lines.

10. The optical modulation device of claim 1, further comprising a variable capacitance element connected between one ends of the first and second parallel lines, and wherein second adjacent ends of the first and second parallel lines are connected to each other via a connection line.

11. The optical modulation device of claim 2, further comprising a variable capacitance element connected between one ends of the first and second parallel lines, and wherein second adjacent ends of the first and second parallel lines are connected to each other via a connection line.

12. The optical modulation device of claim 3, further comprising a variable capacitance element connected between one ends of the first and second parallel lines, and wherein second adjacent ends of the first and second parallel lines are connected to each other via a connection line.

13. The optical modulation device of claim 1, further comprising an input terminal having a first branch and a second branch, means for capacitively coupling the first branch to an end of the first one of the first and second parallel lines, and means for inductively coupling the second branch to an end of second one of the first and second parallel lines.

14. The optical modulation device of claim 2, further comprising an input terminal having a first branch and a second branch, means for capacitively coupling the first branch to an end of first one of the first and second parallel lines, and means for inductively coupling the second branch to an end of second one of the first and second parallel lines.

15. The optical modulation device of claim 3, further comprising an input terminal having a first branch and a second branch, means for capacitively coupling the first branch to an end of first one of the first and second parallel lines, and means for inductively coupling the second branch to an end of second one of the first and second parallel lines.

16. The optical modulation device of claim 1, further comprising an input terminal, and means for capacitively coupling the input terminal to one of the first and second parallel lines, and wherein second adjacent ends of the first and second parallel lines are connected to each other via a connection line.

17. The optical modulation device of claim 2, further comprising an input terminal, and means for capacitively coupling the input terminal to one of the first and second parallel lines, and wherein second adjacent ends of the first and second parallel lines are connected to each other via a connection line.

18. The optical modulation device of claim 3, further comprising an input terminal, and means for capacitively coupling the input terminal to one of the first and second parallel lines, and wherein second adjacent ends of the first and second parallel lines are connected to each other via a connection line.

19. The optical modulation device of claim 1, further comprising an input terminal, and means for inductively coupling the input terminal to one of the first and second parallel lines, and wherein second adjacent ends of the first and second parallel lines are connected to each other via a connection line.

20. The optical modulation device of claim 2, further comprising an input terminal, and means for inductively coupling the input terminal to one of the first and second parallel lines, and wherein second adjacent ends of the first and second parallel lines are connected to each other via a connection line.

21. The optical modulation device of claim 3, further comprising an input terminal, and means for inductively coupling the input terminal to one of the first and second parallel lines, and wherein second adjacent ends of the first and second parallel lines are connected to each other via a connection line.

22. An optical modulation device comprising:
an optical waveguide exhibiting an electro-optical effect;
first and second parallel lines electromagnetically coupled with each other and extending at opposite sides of the optical waveguide respectively, wherein the first line comprises a first line member and a ground plane, and the second line comprises a second line member and the ground plane;
means for applying a light beam to the optical waveguide, wherein the applied light beam propagates along the optical waveguide;
means for feeding a modulating signal to the first and second parallel lines; and
means for exciting a modulating wave in an odd mode in the first and second parallel lines in response to the modulating signal, wherein an electric field is developed between the first and second parallel lines in accordance with the excited modulating wave in the odd mode, and the electric field acts on the optical waveguide to modulate the light beam in accordance with the modulating signal.

23. The optical modulation device of claim 22, further comprising a connection line which connects one ends of the first and second parallel lines to compose a resonator in conjunction with the first and second parallel lines.

24. A method of driving an optical modulation device having an optical waveguide exhibiting an electro-optical effect, and first and second parallel lines electromagnetically coupled with each other and extending at opposite sides of the optical waveguide respectively, wherein the first line comprises a first line member and a ground plane, and the second line comprises a second line member and the ground plane, the method comprising the steps of:

applying a light beam to the optical waveguide, wherein the applied light beam propagates along the optical waveguide;

feeding a modulating signal to the first and second parallel lines; and exciting a modulating wave in an odd mode in the first and second parallel lines in response to the modulating signal, wherein an electric field is developed between the first and second parallel lines in accordance with the excited modulating wave in the odd mode, and the electric field acts on the optical waveguide to modulate the light beam in accordance with the modulating signal.

* * * * *